Aug. 3, 1954
S. P. ROBINSON
2,685,528
RECRYSTALLIZED ALUMINA PEBBLES
Filed Oct. 24, 1949
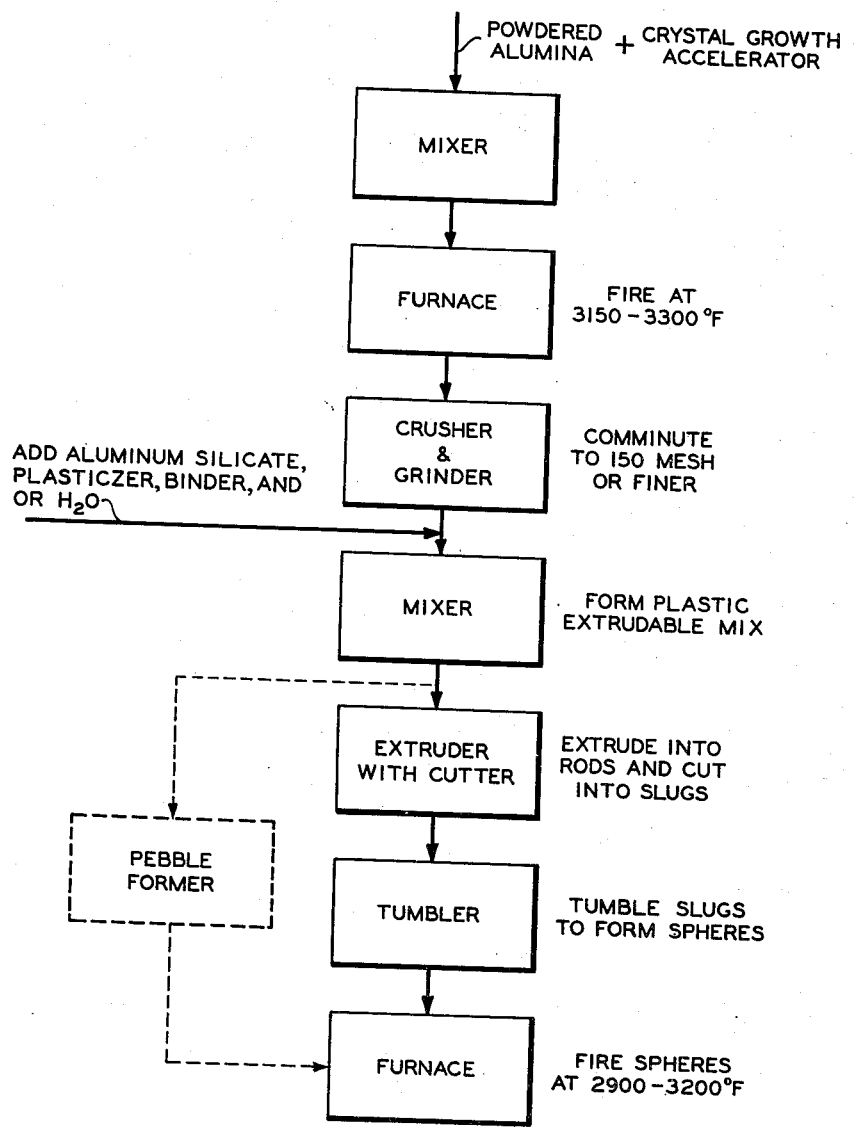
INVENTOR.
SAM P. ROBINSON
BY *Hudson and Young*
ATTORNEYS Patented Aug. 3, 1954

2,685,528

UNITED STATES PATENT OFFICE 2,685,528

RECRYSTALLIZED ALUMINA PEBBLES

Sam P. Robinson, Bartlesville, Okla., assignor to Phillips Petroleum Company, a corporation of Delaware Application October 24, 1949, Serial No. 123,300

15 Claims. (Cl. 106—65)

The invention relates to the manufacture of stabilized alumina pebbles for use in pebble heaters and in other heat-exchange applications. A specific aspect of the invention pertains to recrystallized alumina pebbles having a high resistance to attrition and breakage under severe conditions of cyclic thermal and mechanical shock in moving-bed types of heat transfer apparatus and to a method of manufacturing such pebbles. The invention also relates to the use of recrystallized alumina pebbles in heat-exchange processes wherein heat is absorbed from a gas in one zone by a gravitating mass of pebbles and delivered to another gas in a second zone with recycling of pebbles and concomitant thermal and mechanical shock to the pebbles.

Pebble heater techniques being developed and applied to various gas heating and reaction processes at the present time make use of a compact stream of small refractory pebbles as a moving heat-exchange medium. These pebbles which are usually ceramic materials, although they may be metallic for some applications, are spheres ranging in size from about ⅛" to 1" in diameter. They may be either catalytic or non-catalytic in a given application. In typical pebble heater operation, a continuous compact mass of pebbles descends by gravity through a series of treating zones and upon emerging from the lowermost zone, they are elevated by a suitable elevator, usually of the bucket type, to a point above the uppermost zone for again gravitating through the system. The uppermost zone is usually a pebble heating zone where the pebbles are contacted in countercurrent flow with a stream of hot combustion gas so as to raise the temperature of the pebbles to a desired degree as the pebbles descend through the heating zone. The heated pebbles then pass into a reaction or gas heating zone where they impart heat to the gas being treated and in turn are cooled and require reheating. In some installations, a feed gas preheating zone is positioned just below the reaction or gas treating zone so as to further cool the pebbles before elevation and to preheat the feed gas to the reaction zone. Other installations utilize a pebble preheating zone positioned directly above the pebble heating zone proper where the pebbles are contacted with the effluent from the reaction zone so as to recover a substantial portion of the sensible heat thereof and simultaneously quench the reaction product.

In another type of pebble heat-exchange process, a gravitating mass of pebbles is utilized to maintain a cold zone or cool a gas. The pebbles are cooled by contact with a cold gas in one chamber and the cold pebbles are then gravitated through a second chamber in contact with the gas to be cooled. In such processes the pebbles undergo great differences in temperature with the usual mechanical shock and attrition forces involved in gravitating masses of pebbles.

The pebble heater finds its greatest utility in operations which require extremely fast heating rates and therefore extremely fast pebble cooling rates with concomitant thermal shock to the pebbles. In pebble heater processes involving more severe heating and cooling requirements, the pebbles are subjected to heating rates of as much as 1000° F. per minute and cooling rates of more than 2000° F. per minute at maximum temperatures in the neighborhood of 3000° F. In addition to the severe shock resulting from such rapid temperature changes, the pebbles are subjected to considerable mechanical shock and attrition in passing through the apparatus, the former especially, in the elevator equipment and in dropping from the top of the elevator into the top of the pebble heating zone and the latter in passing through the chambers, the throat or throats between chambers and in the pebble flow-regulating feeder. It is found that considerable breakage and attrition of pebbles occurs when using conventional commercial pebbles under such severe conditions of operation.

The pebbles of the invention are utilized to advantage in such processes as those disclosed in my copending applications Serial No. 651,293, filed March 1, 1946, involving the production of $CS_2$, now abandoned, and Serial No. 662,149, filed April 15, 1946, relating to the cracking of hydrocarbons to hydrogen and coke, now U. S. Patent 2,647,041, as well as the process of the copending application of M. O. Kilpatrick, Serial No. 761,696, filed July 17, 1947, relating to the thermal conversion of hydrocarbons to more desirable hydrocarbons, now abandoned. These processes involve temperature changes of the order of 1000 to 2000° F. per minute, with severe mechanical shock and abrasive forces present.

In a pebble heater process requiring the circulation of between 25,000 and 35,000 pounds of pebbles per hour with a maximum temperature shock of approximately 1000° F. per minute the attrition and breakage loss on the best available commercially produced alumina pebble amounts to at least 200 pounds per day and runs as high as 700 pounds per day. This represents a loss of between 0.8 and 2% per day. The alumina pebbles were selected as the best available commercial pebbles. This substantial loss of pebbles due to attrition and breakage merely emphasizes the need for a rugged, attrition, and shock resistant pebble.

The invention has several objects, viz.:

To provide a stabilized recrystallized alumina pebble having high resistance to attrition and breakage under severe conditions of cyclic thermal and mechanical shock in moving-bed types of processes;

To provide a method of manufacturing recrystallized alumina pebbles stabilized against crystal growth under conditions of severe thermal shock and having high resistance to attrition and breakage; and To provide improved heat transfer processes utilizing stabilized recrystallized alumina pebbles.

Other objects of the invention will become apparent from a consideration of the accompanying disclosure.

The invention is concerned with a method of manufacturing stabilized recrystallized alumina pebbles which involves incorporating in substantially pure, finely comminuted alumina, certain powdered metal oxides which promote maximum crystal growth of the alumina when fired at elevated temperatures, crushing, grinding, or otherwise comminuting the fired alumina and then incorporating aluminum silicate in admixture with the powdered alumina, forming the same into pebbles, and firing the pebbles so as to convert the aluminum silicate to mullite and form a tough tenacious bond for the recrystallized alumina in the pebbles. The oxides which are utilized for accelerating and promoting maximum crystal growth of the alpha alumina during the firing preparatory to the pebble forming step include BeO, $Cr_2O_3$, $Fe_2O_3$, $Mn_2O_3$, and $Ti_2O_3$, and any of the metal compounds readily converted to these oxides during the firing step.

The drawing, which represents a flow of the process of the invention, is self-explanatory and clearly illustrates the essential steps of the process.

The process comprises intimately mixing powdered alumina of at least 150 mesh fineness, and preferably of 325 mesh fineness, and one or more of the crystal growth promoting metal oxides in an amount between 0.1 and 10 weight per cent, preferably 0.5 and 2.5 weight per cent, and firing the mixture at a temperature in the range of 3150 to 3300° F. for a period sufficient to develop alpha corundum crystal growth to an average size of at least 60 microns. A firing time of approximately 3 to 24 hours is sufficient to develop the crystal size required. The fired mixture is then comminuted to a particle size as specified originally and finely divided aluminum silicate of similar particle size is added in an amount in the range of 2 to 20 weight per cent of the alumina, together with a suitable binder and plasticizer, so as to form an extrudable or compactable mix. In lieu of or together with organic binder and plasticizer, the mix may incorporate a suitable amount such as 2 to 20 weight per cent of ball clay with sufficient water to form a mix of plastic consistency. In fact, the ball clay may be added in amounts which supply all of the aluminum silicate requirements of the mix but it is desirable to utilize kyanite or sillimanite for the major proportion of aluminum silicate when maximum amounts of the silicate are to be included because of the lower shrinkage characteristics of these silicates. The mix is then formed into balls usually of a diameter in the range of $\frac{3}{16}$" to 1" by suitable compacting procedures and the resulting balls are fired at a temperature in the range of 2900 to 3200° F. for a period of at least 2 hours and until the porosity of the balls lies in the range of 6 to 18 per cent and preferably 8 to 15 per cent. Firing times up to 40 hours are not detrimental to the pebbles.

Any of the aluminum silicates of the formula $Al_2O_3 \cdot SiO_2$ or $Al_2O_3 \cdot 2SiO_2$ substantially free of glass forming impurities are suitable raw materials for the pebbles. Minerals of the former class include andalusite, kyanite, and sillimanite while the latter includes kaolin and ball clays.

The probable explanation of the success of the process of the invention in producing stabilized alumina pebbles which have exceptionally high resistance to breakage and attrition in moving-bed type heat transfer processes is that the metal oxides promote crystal growth of the alpha corundum to an approximate maximum size before the alumina is reground or otherwise comminuted to small particle size before being formed into pebbles and therefore the crystals do not suffer further growth after they are incorporated in the final pebble. Some evidence of this explanation is found in the fact that alpha alumina calcined in the range of 2900 to 3200° F. develops average crystal size in the range of 25 to 30 microns during the usual firing time to which this material is subjected and that the size of the crystals is increased from that range to the range of 60 to 250 microns by calcination in the presence of the metal oxides used in the invention at a temperature in the range of 3150 to 3300° F. Since it is believed that the cause of pebble breakage of unstabilized alumina pebbles is due largely to the growth of crystals during the heating and cooling steps involved in cyclic heat transfer processes, it appears that the invention produces pebbles consisting largely of recrystallized alpha corundum crystals which are substantially incapable of further growth when subjected to the heating and cooling cycles of conventional pebble heater processes.

A suitable method of compacting the calcined mixture of alumina and metal oxide with aluminum silicate preparatory to the final calcination comprises forming an extrudable mixture of the constituents with between 2 and 10 weight per cent of an organic binder, extruding the mix into rods and cutting the rods into slugs of a length approximating the diameter. The binder must be sufficiently fluid to render the mix soft enough that the extruded slugs are readily compactable into spheres by tumbling in conventional tumbling apparatus. Suitable binders include glue, shellac, dextrin, sugar, casein, lignin, Sterotex, aluminum soaps, artificial and synthetic resins, and other conventional binders for catalyst adsorbents and refractories. In instances where the binder is not sufficiently fluid, water may be added to the mix to provide the necessary plasticity for extrusion and tumbling. When using ball clay in amounts upwards of about 2 per cent water alone serves to properly plasticize and bind the mix.

It has been found that the addition of aluminum silicate, in amounts in the range specified, to the finely comminuted stabilized alumina particles in the pebbles greatly improves their ruggedness under severe thermal and mechanical shock conditions. The aluminum silicate is converted to mullite of the formula $3Al_2O_3 \cdot 2SiO_2$ which interlocks with the fine-grained recrystallized alumina to form an exceedingly strong bond for the pebbles. This mullite bonding material is stable at temperatures up to at least 3300° F. and assures a pebble suitable for temperatures in this range.

The alumina for the pebbles may be any relatively pure (at least 99%) alumina which is convertible to alpha corundum during the initial calcining step as well as lightly burned alpha corundum itself. A typical analysis suitable for the process is as follows:

| | Per cent |
|---|---|
| $Al_2O_3$ | 99.5 |
| $Na_2O$ | 0.20 |
| $Fe_2O_3$ | 0.25 |
| $SiO_2$ | 0.05 |

However, the alpha corundum may be made from any aluminum oxide material by suitable purification and is preferably precalcined at a temperature in the range of 1800 to 2200° F. for best results. Any of the substantially pure alumina hydrates which are readily convertible to alpha corundum upon heating to the above range may be used as the source of the alumina for the pebble. Purified bauxite and the alumina manufactured by the Bayer process are examples of suitable raw materials for the alumina.

The presence of any substantial amount of silica in the pebble material prior to firing the metal oxide-alumina mixture is to be avoided since it interferes with the growth and stabilization of the alpha corundum crystals and the formation of rugged heat resistant pebbles. The maximum amount of silica that can be tolerated in the alumina before firing is 0.2 weight per cent.

Another suitable method of compacting the material into balls, or pebbles, comprises starting with a small crystalline nucleus of the material in the range of 10 to 20 mesh and alternately contacting the nucleus with a tacky binder and powdered pebble material with intermediate tumbling or rolling to compact the powdered material into the binder. This amounts to a modified "snow-balling" procedure.

Compacting of the alumina-metal oxide-aluminum silicate slugs into balls or pebbles can be performed in several ways. Rolling of the slugs in a balling machine utilizing 3-dimensional rotation in a cylindrical drum placed at angles to all three axes of conventional rotary equipment is found to make the most suitable pebbles after firing. The balls are more firmly compacted and more nearly spherical in shape than when made by any other known method. This is probably due to the fact that the slugs are rolled in all directions during the rolling or compacting step. The resulting spherical pebbles with proper moisture content do not stick together and may be stored temporarily or transferred directly to the next step which is the drying operation. Drying to at least 1 weight per cent and preferably to zero moisture content in low temperature drying equipment is essential to prevent warpage and cracking from fast heating in the calcining operation.

It is important that the compacted balls be fired in the range of 2900 to 3200° F. until the porosity of the balls lies in the range of 6 to 18 per cent, and preferably 8 to 15 per cent, which requires a firing time of at least 2 hours and up to 60 hours in some cases, depending upon the particular composition of the pebbles at the time of firing as well as the manner in which the pebbles have been compacted. If the pebbles are fired to a porosity greater than 18 per cent, they are not strong enough to withstand service in heat transfer processes for any appreciable time, while if they are fired to a porosity below 6 per cent, they are apparently too brittle and lack the resiliency necessary to withstand the severe heat and mechanical shock conditions to which they are subjected.

The following examples illustrate the invention, but are not to be construed as unduly or unnecessarily limiting the same.

*Example I*

1100 pounds of 325 mesh Bayer process purified alumina is intimately mixed with 15 pounds of 325 mesh $Mn_2O_3$ and calcined at 3200° F. for 12 hours. The calcined mixture is then crushed and screened through a 325 mesh screen and intimately mixed with 60 pounds of kyanite, 50 pounds of ball clay, and 175 pounds of water. The plastic, homogeneous mass thus formed is extruded in a piston type extrusion press into ⅜" rods which are automatically cut into ⅜" slugs. The slugs are tumbled for 30 minutes in a balling machine utilizing 3-dimensional rotation to produce ⅜" balls which are then fired in a periodic kiln for 16 hours at 3100° F.

The resulting pebbles are smooth and substantially regular 5/16" spheres having a porosity of about 8 per cent and a crushing strength of at least 1400 pounds applied between parallel plates, and have high resistance to cyclic thermal and mechanical shock in pebble heater hydrocarbon conversion processes.

*Example II*

96 parts of Bayer process alumina, 2 parts of $Ti_2O_3$, and 2 parts of $Mn_2O_3$ are intimately mixed and fired at 3200° F. for 8 hours. The resulting mass is crushed and comminuted to pass a 325 mesh screen. The resulting powdered alumina is then mixed with 7 parts of sillimanite of 325 mesh and the mixture is plasticized and homogenized with sufficient Sterotex (hydrogenated corn oil) to form an extrudable mix. The mix is formed into balls by the method of Example I and fired in a periodic kiln at 3150° F. for 15 hours. (All parts by weight.)

The resulting pebbles are comparable in abrasion and breakage resistance to those of Example I.

This application is a continuation-in-part of application Serial No. 53,991, filed October 11, 1948.

Certain modifications of the invention will become apparent to those skilled in the art and the illustrative details disclosed are not to be construed as imposing limitations on the invention.

I claim:

1. A process for manufacturing stabilized recrystallized alumina pebbles which comprises firing at a temperature in the range of 3150 to 3300° F. for at least 3 hours and until the alumina crystals are of an average size of at least 60 microns, an intimate mixture of 90 to 99 weight per cent alumina and at least one member of the group consisting of BeO, $Cr_2O_3$, $Fe_2O_3$, $Mn_2O_3$, and $Ti_2O_3$ in an amount in the range of 0.1 to 10 weight per cent; finely comminuting the resulting alumina mass; forming a plastic compactable mix consisting essentially of the finely comminuted fired alumina, a plasticizing agent, and aluminum silicate in an amount in the range of 2 to 20 weight per cent of the alumina; compacting said mix into small spheres; and firing said spheres at a temperature in the range of 2900 and 3200° F. for at least 2 hours and until their porosity lies in the range of 6 to 18%.

2. The process of claim 1 in which the aluminum silicate consists essentially of ball clay and aluminum silicate of the formula $Al_2O_3 \cdot SiO_2$.

3. The process of claim 1 in which the aluminum silicate consists essentially of ball clay.

4. The process of claim 1 in which $Mn_2O_3$ is incorporated in the mixture with alumina before firing.

5. The process of claim 1 in which $Ti_2O_3$ is incorporated in the mixture with alumina before firing.

6. The process of claim 1 in which $Cr_2O_3$ is incorporated in the mixture with alumina before firing.

7. Mullite-bonded stabilized recrystallized alumina pebbles manufactured by the process of claim 1.

8. Mullite-bonded stabilized recrystallized alumina pebbles containing $Mn_2O_3$ manufactured by the process of claim 1.

9. Mullite-bonded stabilized recrystallized alumina pebbles containing $Ti_2O_3$ manufactured by the process of claim 1.

10. Mullite-bonded stabilized recrystallized alumina pebbles containing $Cr_2O_3$ manufactured by the process of claim 1.

11. A process for manufacturing mullite-bonded stabilized recrystallized alumina pebbles which comprises firing at a temperature in the range of 3150 to 3300° F. for at least 3 hours and until the alumina crystals are of an average size of at least 60 microns, an intimate mixture of 97.5 to 99.5 weight per cent of alumina and at least one member of the group consisting of BeO, $Cr_2O_3$, $Fe_2O_3$, $Mn_2O_3$, $Ti_2O_3$ in an amount in the range of 0.5 to 2.5 weight per cent, comminuting the resulting alumina mass to a fineness of at least 200 mesh; forming a plastic extrudable mix consisting essentially of the finely comminuted fired alumina, a plasticizing agent, and aluminum silicate in amount in the range of 2 to 20 weight per cent of the alumina; extruding said mix into rods of a diameter in the range of $\frac{3}{16}''$ to $1''$; cutting said rods into slugs of a length approximating their diameter; tumbling said slugs so as to compact them into spheres; and firing said spheres at a temperature in the range of 2900 to 3200° F. for at least 2 hours and until their porosity lies in the range of 8 to 15%.

12. The process of claim 1 in which BeO is incorporated in the mixture with alumina before firing.

13. The process of claim 1 in which $Fe_2O_3$ is incorporated in the mixture with alumina before firing.

14. Mullite-bonded stabilized recrystallized alumina pebbles containing BeO manufactured by the process of claim 1.

15. Mullite-bonded stabilized recrystallized alumina pebbles containing $Fe_2O_3$ manufactured by the process of claim 1.

References Cited in the file of this patent

UNITED STATES PATENTS

| Number | Name | Date |
|---|---|---|
| 954,808 | Jeppson et al. | Apr. 12, 1910 |
| 954,809 | Jeppson | Apr. 12, 1910 |
| 2,035,845 | Stanton | Mar. 31, 1936 |
| 2,218,584 | McDougal et al. | Oct. 22, 1940 |
| 2,270,607 | Ryschewitsch | Jan. 20, 1942 |
| 2,348,847 | Pike | May 16, 1944 |
| 2,369,709 | Baumann et al. | Feb. 20, 1945 |
| 2,389,636 | Ramseyer | Nov. 27, 1945 |
| 2,413,441 | Feichter | Dec. 31, 1946 |
| 2,432,873 | Ferro, Jr., et al. | Dec. 16, 1947 |
| 2,460,811 | Davies et al. | Feb. 8, 1949 |
| 2,478,757 | Foster | Aug. 9, 1949 |